United States Patent [19]

Yamada, et al.

[11] Patent Number: 4,907,173
[45] Date of Patent: Mar. 6, 1990

[54] WORD PROCESSOR

[75] Inventors: Shiro Yamada, Kasugai; Keiichi Hirata, Kuwana; Minoru Oishi, Nagoya; Yoshinari Morimoto, Nagoya; Akihiro Furukawa, Nagoya; Atsuko Kawasumi, Nagoya, all of Japan

[73] Assignee: Brother Kogyo Kabushiki Kaisha, Japan

[21] Appl. No.: 72,447

[22] Filed: Jul. 13, 1987

[30] Foreign Application Priority Data

Jul. 14, 1986 [JP] Japan ............................. 61-165261
Jul. 15, 1986 [JP] Japan ............................. 61-166215

[51] Int. Cl.⁴ ............................................. G06F 3/14
[52] U.S. Cl. ........................................ 364/518; 400/63; 400/83
[58] Field of Search ............. 364/518, 519, 521; 340/63, 83, 709; 400/279

[56] References Cited

U.S. PATENT DOCUMENTS

| 4,355,913 | 10/1982 | Rutkowski, Jr. ............... | 400/63 |
| 4,663,731 | 5/1987 | Ikegami et al. ................ | 364/900 |
| 4,674,065 | 6/1987 | Lange et al. ................... | 364/900 |
| 4,742,485 | 5/1988 | Carlson et al. ................. | 364/900 |
| 4,786,894 | 11/1988 | Furusawa et al. ............. | 340/709 |
| 4,789,255 | 12/1988 | Hays et al. ..................... | 400/63 |
| 4,804,284 | 2/1989 | Hattori et al. .................. | 400/279 |

OTHER PUBLICATIONS

Csurics et al., "Method of Propagating Attribute Information for Displays", IBM Tech. Disclosure Bulletin, vol. 26, No. 5, 10/83, p. 2390.
McGilson et al., "Introducing the UNIX System" McGraw-Hill Book Company-1983, pp. 1-7, 209-215 and 280-303.
Adam et al., "Single Line Adjust" IBM Technical Disclosure Bulletin, vol. 24, No. 9, Feb. 1982, pp. 4589-4591.
Fountain et al., "Display Screen Updating in Data Processing Technical Emulation by Text Processing Terminal" IBM Tech. Discl. Bulln., 8/83, p. 1396.

*Primary Examiner*—Gary V. Harkcom
*Assistant Examiner*—Phu K. Nguyen
*Attorney, Agent, or Firm*—Oliff & Berridge

[57] ABSTRACT

A word processor with display screen having a search and replace function wherein, when the cursor is positioned at the head of a character queue input area on the display screen in the search and replacement mode, a correction key stroke causes all the characters displayed in the character queue input area to be erased, so the character queues of the SEARCH and REPLACE WORDS can be easily and efficiently entered and the time required for text memorization and editorial operations by the word processor is reduced. Furthermore, the accuracy and ease of conversion of words or phrases in the text is improved, especially with regard to appropriate conversion between capital and small characters.

2 Claims, 12 Drawing Sheets

WORD PROCESSOR

BACKGROUND OF THE INVENTION

1. Field of the Invention

This invention relates generally to word processors, and in particular to word processors having the function of searching for and replacement of words and phrases.

2. Description of the Related Art

Related word processors capable of search and replacement function are inconvenient to use and have functional weakpoints in such instances, e.g., when the operator desires to change a SEARCH WORD or REPLACE WORD during the editing operation. When the operator intends a correction and a cursor is positioned at the first slot of a SEARCH WORD or a REPLACE WORD queue displayed on the screen, a correction key stroke causes only one character of the queue to be erased. If the operator enters a new SEARCH WORD or a REPLACE WORD for correction or modification when other SEARCH WORDS or REPLACE WORDS remain backed-up in a memory circuit, then all character queues of a SEARCH WORD or REPLACE WORD stored in a back-up memory are erased.

As used herein, the capitalized words "SEARCH WORD" and "REPLACE WORD" particularly represent the words or phrases which the operator desires to search for and to replace the found SEARCH WORDS, respectively.

It is thus difficult, and requires complicated steps, for the operator to erase all the backup SEARCH WORDS and REPLACE WORDS or to modify just some of them.

In another instance the related word processor search and replacement operation offers three options for finding word queues. Under the first option, the processor finds the words headed with a capital character. Under the second option the processor finds the words headed with a small character, and under the third option picks up both types of words throughout the whole text. However, such a command is not allowed so as to replace a found word with a REPLACE WORD which is optionally headed with a capital character or a small character. Further, even a processor capable of such options has not been sufficiently efficient for practical needs.

For example, if the operator desires to search "one", "One" and "ONE" in the text and to convert all of them to "orange", such conversions are performed by the prior art word processors as follows:

(1) one→orange
(2) One→Orange
(3) ONE→ORAnge

Even when "ONE" in the case (3) must be replaced with "ORANGE", with all large characters, with the prior art word processors only the first three letters equivalent to "ONE" are replaced with capital characters and the rest are replaced with small characters. Consequently, the related word processors are not capable of performing adequate conversions.

SUMMARY OF THE INVENTION

In light of the above, it is an object of the invention to provide an improved word processor which enables the search and replacement function to be performed with easier steps and more efficiently, and which furthermore enables the conversion between capital characters and small characters to be executed more smoothly and correctly using the search and replacement function.

A word processor embodying the present invention is equipped with: a keyboard unit on which character keys, a correction key and such are mounted; a display screen on which entered characters and various indications are displayed; a search and replacement function for detecting a particular character queue throughout an entire text previously entered and stored according to the operator's commands; and a character queue input area on the display screen in which a character queue of a SEARCH WORD is displayed. In accordance with the invention, a stroke on the correction key erases all characters displayed in the character queue input area, when a cursor is positioned at the first slot of the character queue input area in the search and replace mode. As a result, the new entry of a SEARCH WORD or REPLACE WORD can be executed properly and easily, without disturbing other operations. Moreover, the time necessary for the CPU to effectuate the text editorial operation and memorization is reduced.

Further a word processor which embodies the present invention, finds the SEARCH WORD in the text stored by the memory device, memorizes the REPLACE WORD queue, and replaces each found SEARCH WORD with the REPLACE WORD once stored in the memory device. A word processor according to the present invention is especially capable of determining a character or word form from among three options, namely a word form headed by a capital character, or word forms consisting of all small characters or all capital characters. The desired word form of the REPLACE WORD is determined, and therefore the proper conversion in each case is performed easily and efficiently.

BRIEF DESCRIPTION OF THE DRAWINGS

The above and other objects of the present invention will be fully understood from the following detailed description of preferred embodiment with reference to the accompanying drawings, in which.

DETAILED DESCRIPTION OF THE PREFERRED EMBODIMENTS

Figure 1:
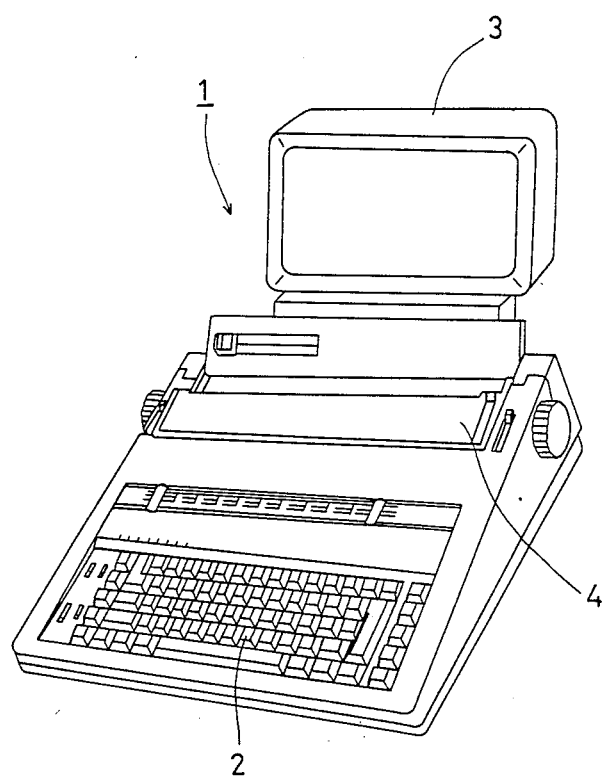
FIG. 1 is a perspective view of a word processor embodying the present invention.

Referring to FIG. 1, a first embodiment of a processor 1 according to the invention includes a keyboard unit 2 on which various mode determinations and character queue entries are performed, a display unit 3 equipped with a CRT screen device, and a printer 4 for printing stored data. Utilizing the CRT screen, display unit 3 displays characters, indications and such, which are inputted through the keyboard unit 2.

Figure 2:
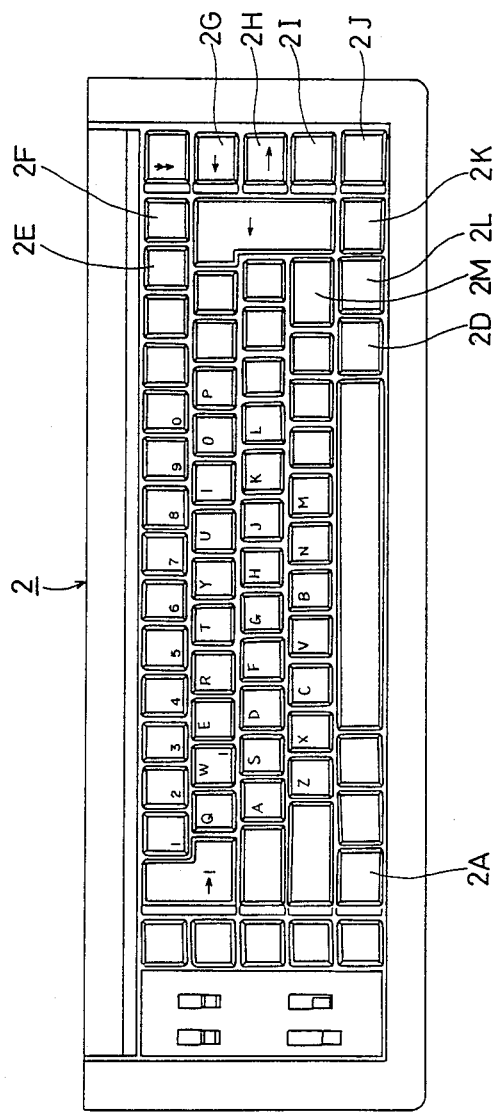
FIG. 2 is a top view of the keyboard unit of the word processor shown in FIG. 1.

Referring to FIG. 2, various function keys and character keys are distributed on keyboard unit 2. Keys indicated by 2A, 2D, 2E, 2F, 2G, 2H, 2I, 2J, 2K, 2L and 2M will be referred to later in the description.

Figure 3:
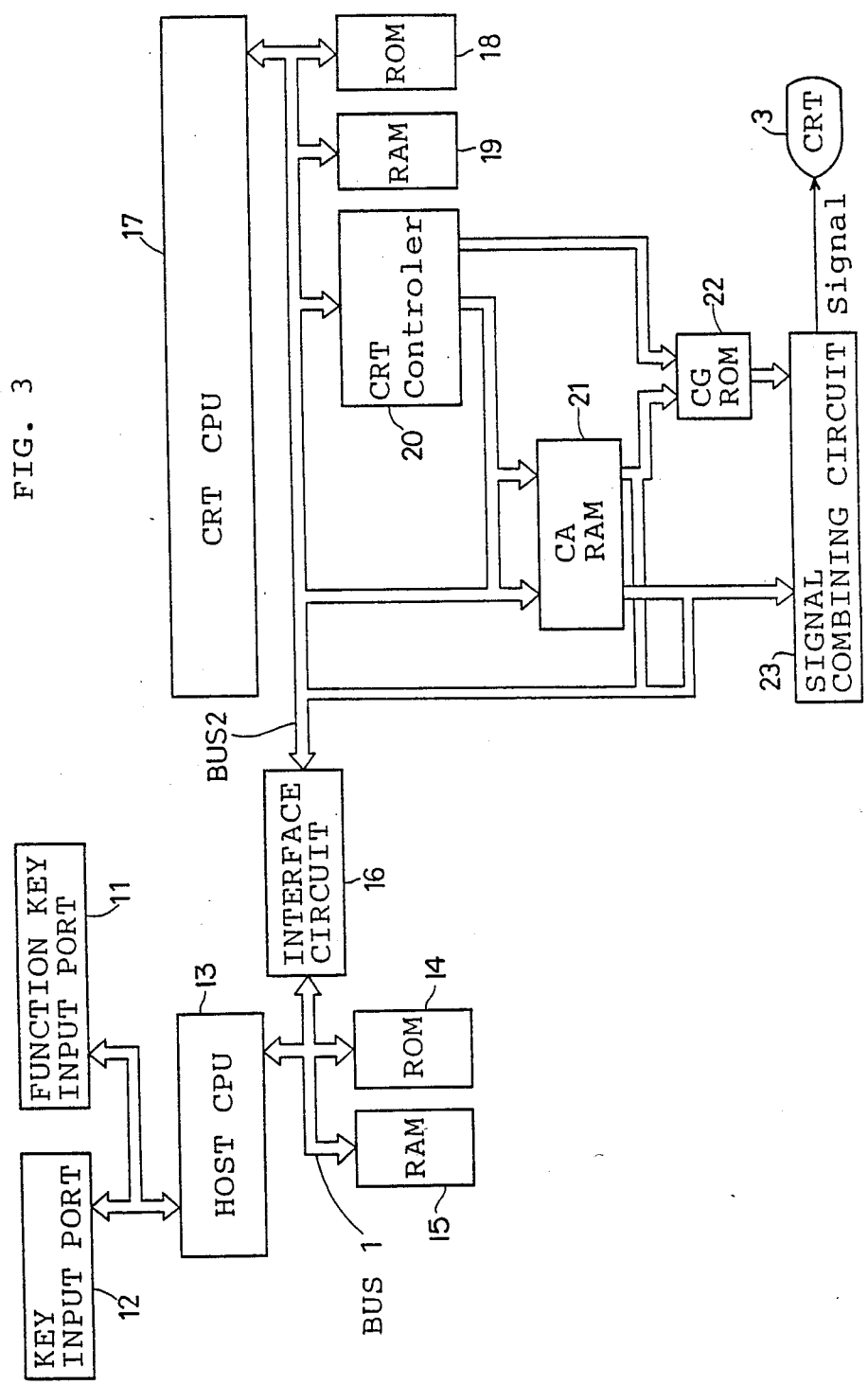
FIG. 3 is a block diagram showing the electrical control circuitry of the word processor shown in FIG. 1.

As illustrated in FIG. 3, the function keys on the keyboard unit 2 are connected to a function key input port 11, and the character keys are connected to a key input port 12. The function key input port 11 and the key input port 12 constitute an interface interconnecting a host computer 13 (host CPU 13) with the function keys and the character keys. A read only memory (ROM) 14 and a random access memory (RAM) 15 are connected to the host CPU 13 via a bus line, BUS 1.

ROM 14 has a general control program for the word processor 1, and RAM 15 stores, for example, function data or character data entered by way of keyboard strokes.

The host CPU 13 communicates to a CRT-controlling computer 17 (CRTCPU 17) for controlling the display unit 3 via an interface circuit 16. The CRTCPU 17 is connected with a ROM 18, RAM 19 and CRT controller 20, respectively, via a second bus line, BUS 2. The ROM 18 has a control program for controlling the display screen CRT, and RAM 19 temporarily stores various data created when the CRT is controlled. A character attribute random access memory (CARAM) 21 is connected to the output port of the CRT controller 20, for memorizing characters, and attribute data such as underline and boldface type. Further a signal combining circuit 23 is connected to the CARAM 21 such that data retrieved from the CARAM 21 and data from a character generating read only memory (CGROM) 22 are combined together in response to a command issued by the CRT controller 20.

Figure 4A:
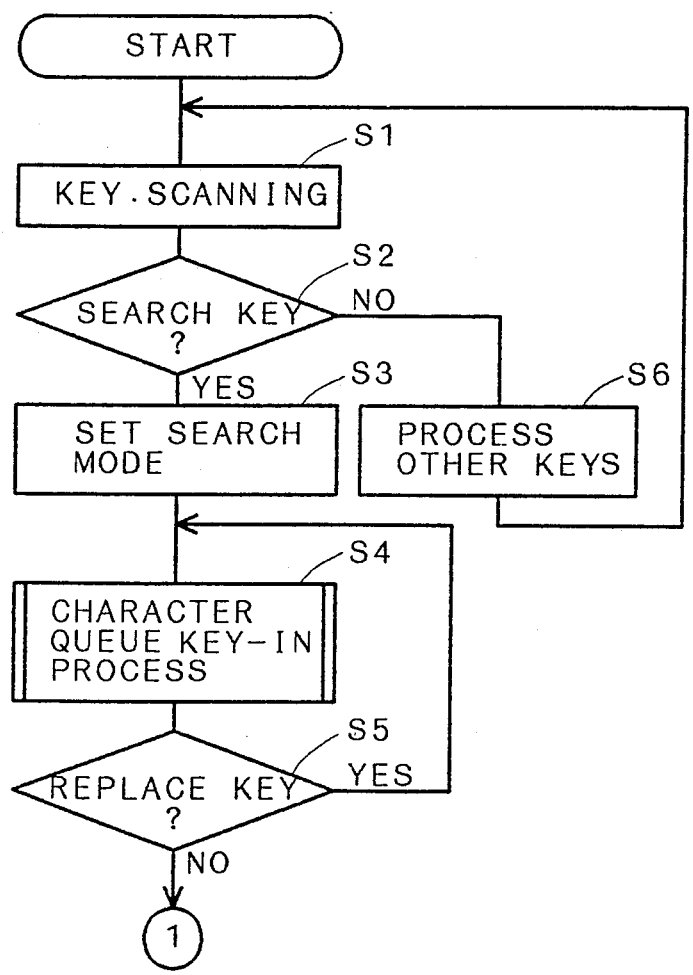
FIGS. 4A and 4B, and FIGS. 5A and 5B are all flow charts illustrating a series of operations of the word processor shown in FIG. 1.
Figure 4B:
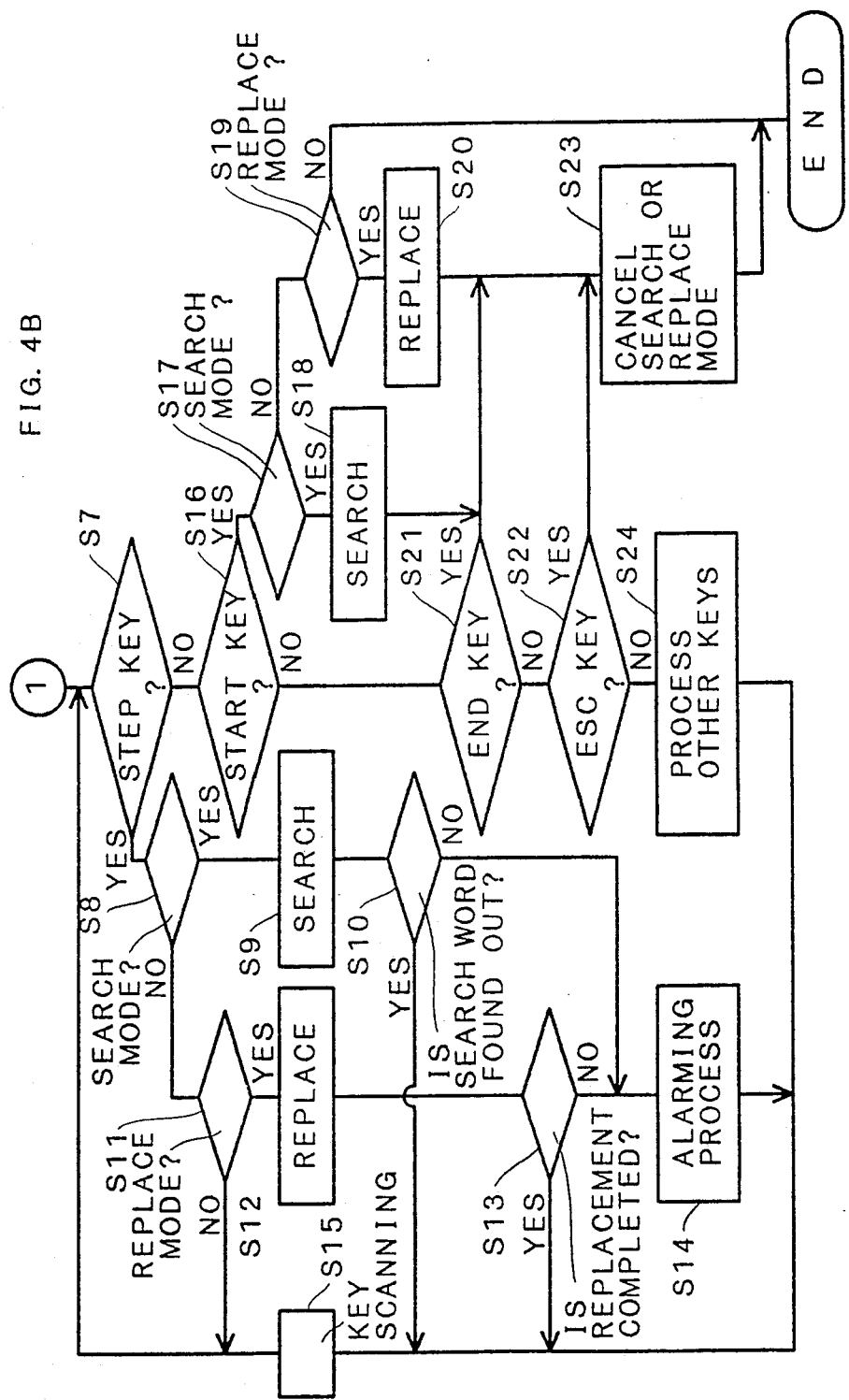
Figure 5A:
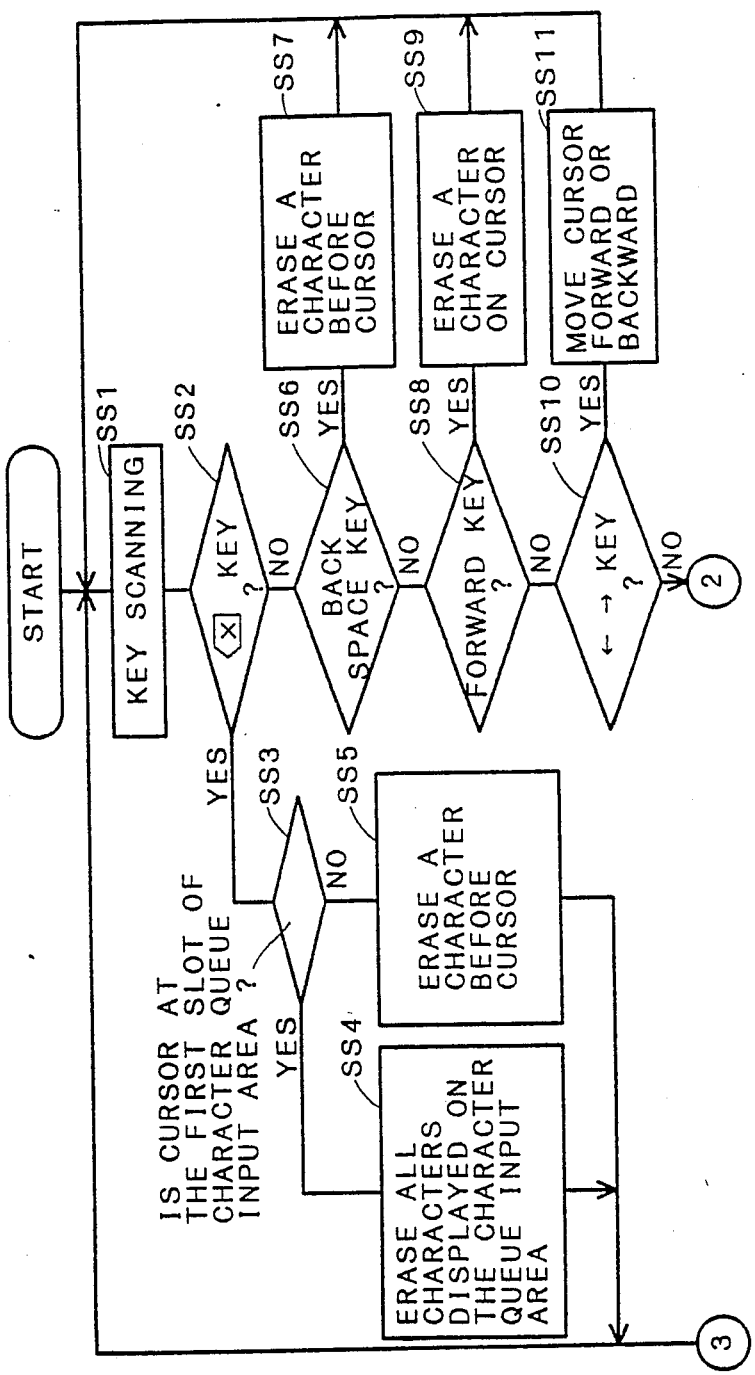
Figure 5B:
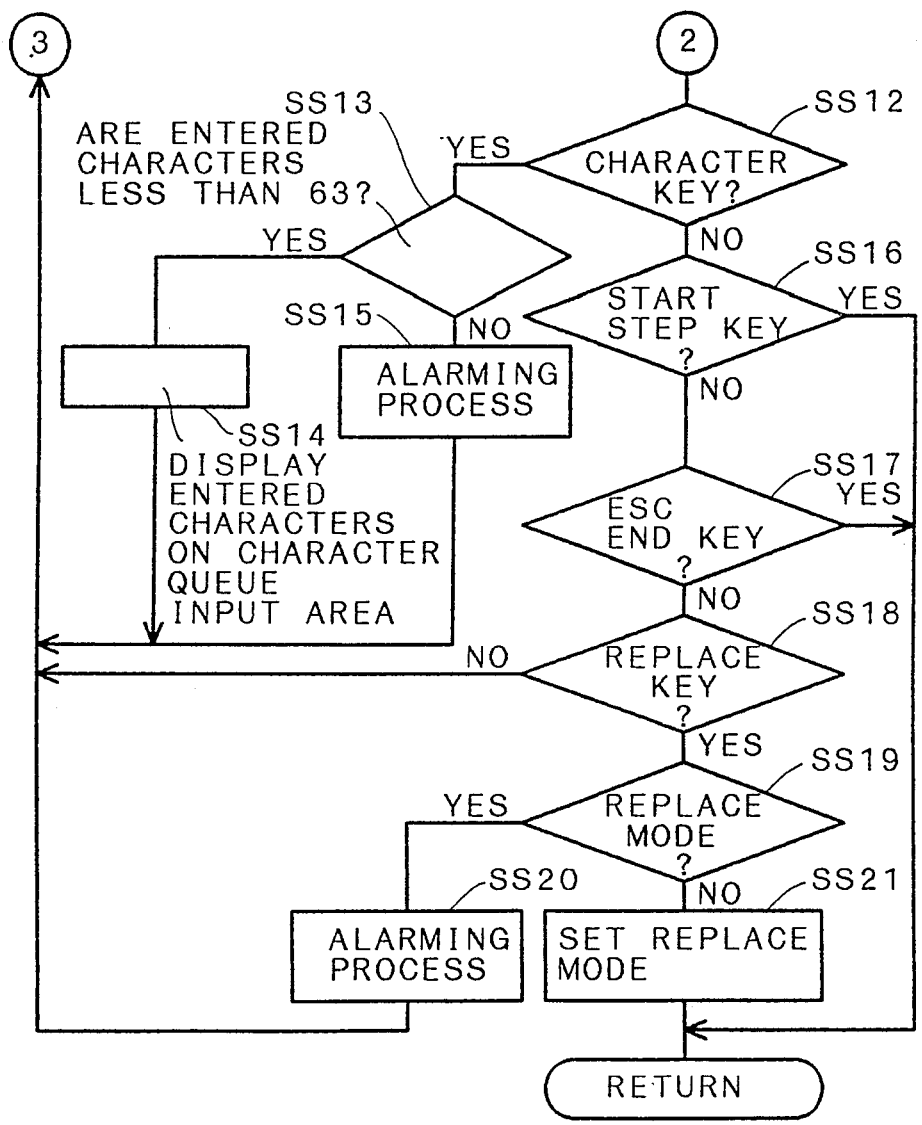

The word processor 1 executes the routines illustrated in the flow charts of FIGS. 4A and 4B, and FIGS. 5A and 5B. The flow chart shown in FIGS. 4A and 4B essentially illustrates the searching and replacing process or procedure, and the flow chart in FIGS. 5A and 5B illustrates a detailed subroutine of a character queue key-in process or procedure.

At the stage of the word processor's memory and editorial operation, the host computer 13 follows the steps denoted S1 through S24 in the flow chart of FIGS. 4A and 4B and SS1 through SS21 in the flow chart of FIGS. 5A and 5B. Each of these steps will be respectively referred to in the following description simply as "S1", "S2" and so on to "S24", or "SS1", "SS2" and so on to "SS21".

The searching and replacing process begins at S1 in FIG. 4A with key scanning. If a SEARCH key 2A is acknowledged to be depressed at S2, subsequently at S3 the search mode is set "on" and a character queue input area appears on the CRT screen of the display unit 3. When the search mode is activated, a character queue keyin procedure is started at S4, the details of which will be described hereinbelow with reference to the flow chart of FIGS. 5A and 5B.

A key scanning starts at SS1 in FIG. 5A, and if a stroke of a correction key 2D is recognized at SS2, the host computer 13 determines whether or not the cursor is located at the first slot of the character queue input area displayed on the CRT screen at SS3. If the cursor is located at the first slot, i.e., a YES determination is made, the characters displayed in the character queue input area are all erased at SS4. Otherwise, if NO determination is made, a character one position to the left of the cursor is erased at SS5 and the procedure returns to SS1, that is, key scanning is restarted.

Figure 6:
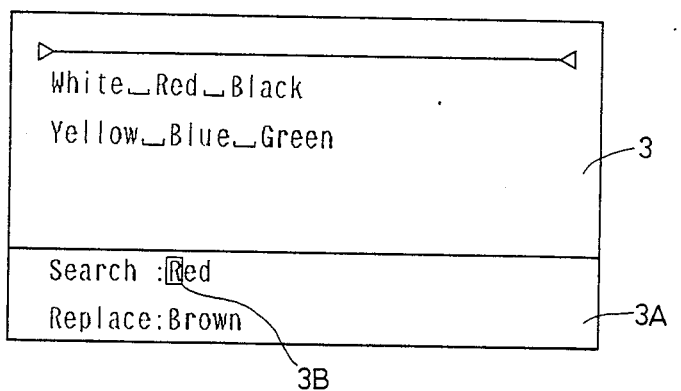
FIG. 6 illustrates one example of a display screen associated with a word processor embodying the invention.

If a stroke of a back space key 2E on the key board 2 is recognized at SS6, a character one positon to the left of the cursor is erased at SS7. If a stroke of a forward key 2F is recognized at SS8, just the character at the cursor position is erased at SS9. If a stroke of a cursor shift key 2G (←) or 2H (→) is recognized at SS10, the cursor is shifted forward or backward according to how many times the cursor shift key is depressed. If any character key is pressed during key scanning at SS1, i.e., a YES determination is made at SS12, SS13 then determines if the number of character key strokes are not more than a predetermined value, e.g., 63. If a YES determination is made at SS13, namely the number of character key strokes is not more than 63, the characters entered through the keyboard unit 2 are displayed on the display unit screen 3 at SS14. Otherwise, if a NO determination is made, namely, the number of character key strokes is more than 63, SS15 activates an associated alarm device mounted in the word processor (not shown) in order to alarm an operator of this unacceptable entry, and subsequently the procedure then returns to SS1. A repetition of these steps SS1 to SS15 as described hereinabove accordingly facilitates display of the SEARCH WORD in the character queue input area 3A, as shown in FIG. 6, in which a word Red is displayed as an example of the SEARCH WORD. If the correction key 2D is pressed with the cursor 3B located at the first slot of the displayed SEARCH WORD Red as shown in FIG. 6, these characters displayed in the character queue input area 3A are all erased.

If a start key 2I or step key 2J is pressed during key scanning at SS1, SS16 recognizes the stroke thereof, i.e., a YES determination is made, and the process returns to S1 shown in FIG. 4A. Similarly, if an escape key 2K or an end key 2L is pressed during key scanning at SS1, SS17 makes a YES determination and the process returns to S1. If a replace key 2M is detected to be pressed during key scanning at SS1, SS19 determines if the operation is under replace mode. If a YES determination is made at SS19, the computer 15 activates the associated alarm device at SS20 in order to sound an alarm buzzer, and then returns to SS1. If SS18 recognizes no stroke of the replace key 2M, the procedure returns to SS1. Furthermore, if SS19 determines that the word processor is not in the replace mode, SS21 sets the replace mode anew and subsequently proceeds to S4 shown in FIG. 4A. This repetition of steps SS1 through SS15 facilitates a display of the REPLACE WORD in the character queue input area 3A as shown in FIG. 6, in which Brown is displayed as an example of the REPLACE WORD.

The character queue key-in process is executed as described hereinbefore, as a subordinate procedure involved in the global progression shown in the flow charts of FIGS. 4A and 4B.

Referring again to FIGS. 4A and 4B, the main stream of the search and replacement procedure will now be described. If S5 recognizes the stroke of the replace key 2M during key scanning at SS1, i.e. a YES determination is made at S5, the procedure returns to S4 so as to execute the character queue key-in process. If a NO determination is made at S5, namely, if the operator presses the replace key 2M, the procedure proceeds to S7, in which a determination is made whether the step key 2J is depressed. If the step key 2J is pressed, i.e. a YES determination is made S8 determines if the operation is under search mode. If the operation is under search mode, S9 performs searching and shifts the cursor at the head of the word queue which the computer picked for the first search.

In the subsequent step S10 a determination is made whether or not the SEARCH WORD is searched out. If a YES determination is made at S10, namely if the SEARCH WORD is found in the text, procedure moves forward to S15, in which the key scanning is restarted, and then returns to S7. If a NO determination is made at S10, namely the SEARCH WORD has not been found, the process moves forward to S14, in which an alarm process is implemented which causes the CRT to display "NOT FOUND" on the display screen 3, the procedure then proceeds to S15. Referring to S8, if it is determined that the operation is not in a search mode S11 next determines if the operation is in a replace mode. If it is in a replace mode, S12 performs replacement on the first searched word, for example in FIG. 6., Red is replaced with Brown. Subsequently, S13 determines if the replacement is completed, and the program moves forward to S15 if it a YES a determination is made at S13. If a NO determination is made at S13, the abovementioned alarm process is performed.

Referring back to S7, if S7 determines that the step key 2J is not pressed, then S16 determines if the start key 2I is pressed. If a YES determination is made at S16, namely, if the start key 2I is stroked, then S17 determines if the operation is in a search mode. If it is in a search mode operation, S18 shifts the cursor at the head of the first found SEARCH WORD and subsequently concludes searching, and the program proceeds to S23. If a NO determination is made at S17, namely, the operation is not in the search mode, S19 then determines if the operation is in a replace mode. If it is in a replace mode, S20 performs replacement such that all the SEARCH WORDS found in the text are replaced with the predetermined REPLACE WORD. The procedure then forward to S23. If a NO determination is made at S19, namely, the operation is not in a replace mode, the present routine ends and proceeds to the next one.

Either if S21 determines that the end key 2L is pressed at SS1, or if S22 determines that the escape key 2K is pressed at SS1, the program proceeds to the subsequent step S23. If neither end key 2L nor escape key 2K is acknowledged to be pressed at both steps, S24 advances other key processes and returns to S15 for key scanning.

S23, resulting from S20, S21 and S22, cancels the search or replace mode in which the abovementioned operation developed, and consequently the character queue input area disappears on the CRT screen 3. Thereafter, the search and replacement mode of operation according to the invention concludes and the next routine is advanced.

Now that the present invention is more clearly understood a second embodiment of the invention will now be described with reference to attached drawings and flow charts.

The word processor according to the second embodiment is configured like the first embodiment shown in FIG. 1 and FIG. 2, which has been already explained in detail hereinabove. Referring to the flow charts of FIG. 7, and FIGS. 8A and 8B, the search and replacement process employed in the second embodiment will now be described.

Figure 7:
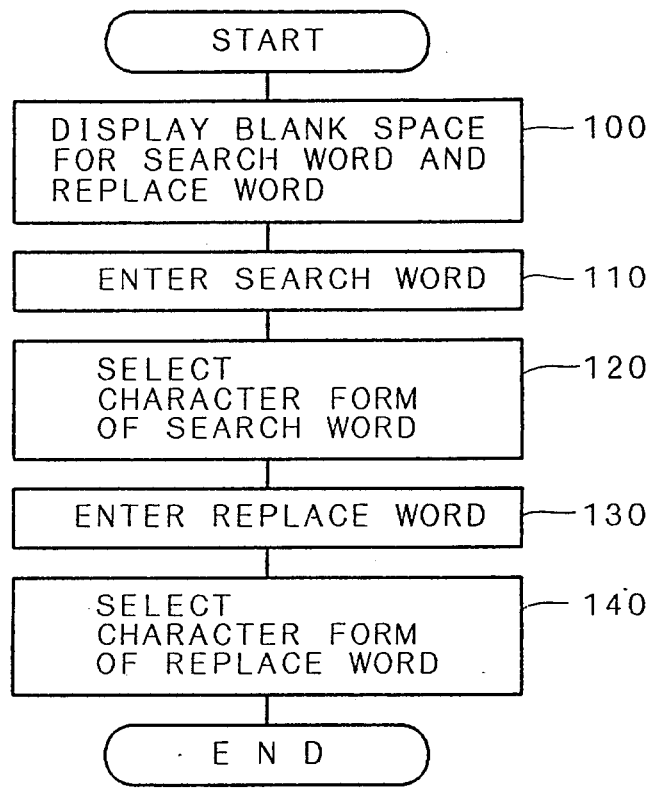
FIG. 7, FIGS. 8A and 8B are flow charts illustrating a series of operations of a second embodiment of a word processor embodying the invention.
Figure 9:
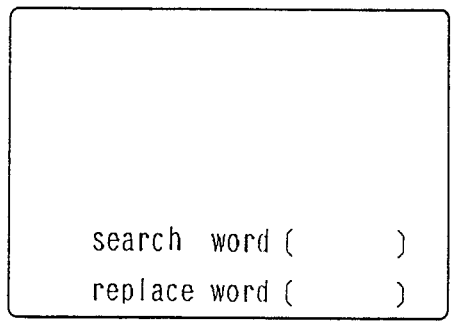
FIGS. 9 is a display screen indicating a SEARCH WORD and REPLACE WORD in the search and replace mode operation.

First referring to FIG. 7, if the replace key 2M is depressed, the screen 3 displays input blank spaces for the entry of the SEARCH WORD, and REPLACE WORD as shown in FIG. 9, at step 100. Step 110 receives the entry of a SEARCH WORD from the keyboard 2, and the character or word form is selected from among several options at the next step 120. If the operator selects "ON" on the key board, the computer searches for words having character forms identical to the form of the SEARCH WORD which the operator entered at step 110, namely, only those words having the same composition of capital and small characters are found. Alternatively, if the operator selects "OFF", all the like words are searched out regardless of the composition of capital/small characters in the word form. In other words, one of the forms "one", "One" or "ONE" is searched in the "ON" mode, otherwise all those forms are searched with regard to the character composition in the "OFF" mode. A selection of "ON" or "OFF" determines this option.

Next, step 130 receives the entry of the REPLACE WORD from the keyboard unit 2, and then at step 140 the optional character form of the REPLACE WORD is determined according to the input from the keyboard unit 2. If the operator selects "ON", all of the SEARCH WORDS are replaced with the REPLACE WORD, with the character form of the REPLACE WORD unchanged from the original entered form, regardless of character forms of the found SEARCH WORDS in the text. Alternatively if the operator selects "OFF", each found SEARCH WORD in the text is replaced with the REPLACE WORD according to the equivalent character composition form thereof. Namely, the REPLACE WORD is given a different character composition form in each case which corresponds to the capital and small characters respectively of the individual found SEARCH WORD in the text, regardless of the original REPLACE WORD's character composition. In other words, referring to the example given hereinabove, according to each SEARCH WORD's character composition, the found SEARCH WORD "one" is replaced with the REPLACE WORD in the form of "orange", "One" is replaced with "Orange", and "ONE" is replaced with "ORANGE". In contrast, all of the found SEARCH WORDS would be converted to the form of "orange" despite their various forms if the operator selected the former option, "ON".

Figure 8A:
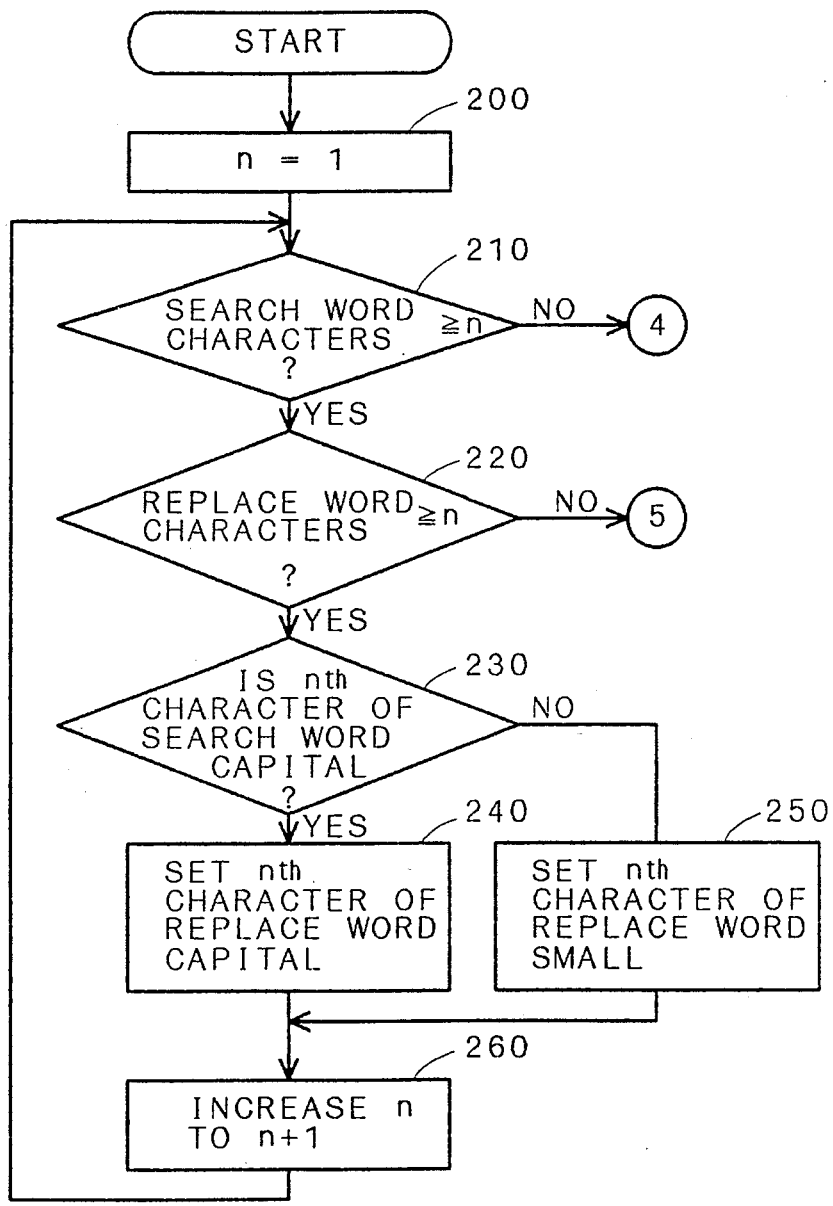
Figure 8B:
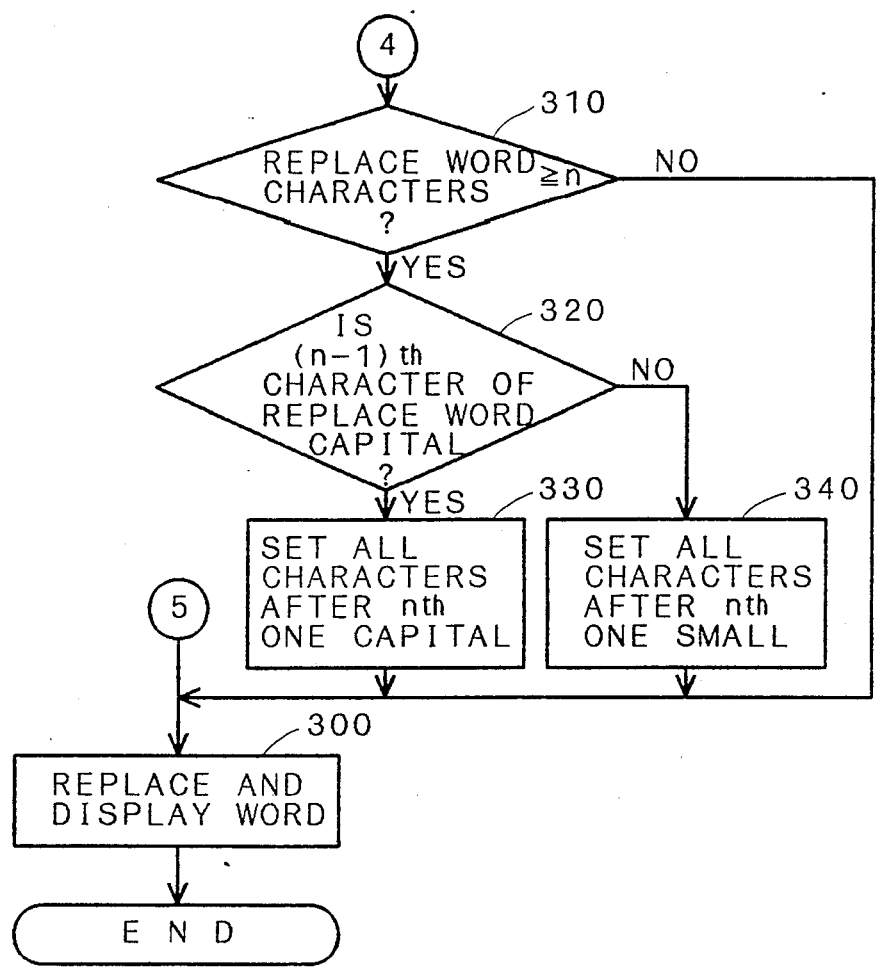

The flow chart in FIGS. 8A and 8B specifically illustrates the process or procedure performed when "OFF" at step 120 and "OFF" at step 140 are selected in the flow chart shown in FIG. 7. This procedure searches for all the like words and phrases regardless of the character form compositions thereof, and replaces them with, REPLACE WORD entered by the operator, in the form corresponding to that of each SEARCH WORD in the text respectively, so that the REPLACE WORDS have equivalent character compositions to the replaced SEARCH WORDS in each case.

At the first step 200, the procedure starts with initialization, namely, setting n=1. Next step 210 determines if the number of SEARCH WORD characters is not less than n, and similarly step 220 determines if the number of REPLACE WORD characters is not less than n. Since N=1 at this step, the first character of the SEARCH WORD is to be compared.

Step 230 determines if the nth character (the first character during the first iteration) of the SEARCH WORD is capital. If determined to be a capital, the nth character (the first character) of the REPLACE WORD is set to be a capital at step 240. If step 230 determines the nth character of the SEARCH WORD to be small, next step 250 sets the nth character of the REPLACE WORD to be small. After executing the foregoing steps, n is increased to n+1 at step 260, and the procedure then returns to step 210 in order to repeat the same sequence of steps for the second character, up to step 260.

If the number of the REPLACE WORD characters is determined to be less than n at step 220, that is after the last character of the REPLACE WORD is compared in the abovementioned procedure, step 300 performs a replacement of the SEARCH WORD with the REPLACE WORD throughout the text and displays it on the screen.

On the other hand, in the case where a NO determination is made at step 210 and a YES determination is made at step 310, that is, all characters of the SEARCH WORD have been checked and unchecked REPLACE WORD characters remain, the procedure moves forward to step 320. Step 320 determines whether the (n−1)th character of the REPLACE WORD is capital or small, after the prior characters of the REPLACE WORD have been determined to be capital or small at step 240 or 250. If it is capital, step 330 sets the nth and all remaining characters after the nth one to be capital; and they are set to be small at step 340 if the (n−1)th character is small. The SEARCH WORD is thus replaced with the REPLACE WORD and displayed at step 300.

The second embodiment described hereinbefore enables not only the replacements (1) and (2) listed below, but also such a replacement as (3) shown below:
(1) one→orange
(2) One→Orange
(3) ONE→ORANGE The proper arrangement with respect to capital and small characters is thus attained in the present embodiment.

In this embodiment, the SEARCH WORD is automatically replaced according to the character form of the SEARCH WORD as explained by the flow chart of FIGS. 8A and 8B. However, alternatively a new entry from the keyboard 2 may provide a REPLACE WORD having an optional form when the SEARCH WORD is displayed on the screen.

Having described our invention with relation to the embodiments shown in the accompanying drawings, it is our intention that the invention be not limited by any of the details of the description, unless otherwise specified, but rather should be construed broadly within its spirit and scope as set out in the accompanying claims.

What is claimed is:

1. A word processor comprising:
   a keyboard unit including character keys, a search key and a replace key,
   memory means for storing character queues entered from the keyboard;
   display means responsive to keyboard strokes for displaying on a display an entered character queue, and for displaying in a character queue input area of the display a SEARCH WORD character queue and a REPLACE WORD character queue entered from the keyboard;
   search means for finding an entered SEARCH WORD character queue among the character queues stored in the memory means in a search mode set by a stroke of the search key, said search means having first and second optional search modes, wherein in the first mode the search means searches for stored character queues having the same character form as the SEARCH WORD character queue, and wherein in the second mode the search means searches for stored character queues without regard to the character form of the SEARCH WORD character queue; and
   replace means for replacing each found instance of the SEARCH WORD character queue searched by the search means with an entered REPLACE WORD character queue, the replace means having a first optional replace mode in which the character form of the REPLACE WORD character queue remains unchanged from an original entered character form for each replacement of a found SEARCH WORD character queue, and a second optional replace mode in which the character form of the REPLACE WORD character queue is modified to coincide with that of each found SEARCH WORD being replaced,
   the replace means including determination means for determining in the optional second replacement mode whether the REPLACE WORD character queue is longer than the SEARCH WORD character queue,
   first modifying means responsive to the determination means for modifying the character form of the first n characters of the REPLACE WORD character queue to respectively coincide with the character form of the characters of the SEARCH WORD character queue when the REPLACE WORD character queue is longer than the SEARCH WORD character queue, n being the number of characters in the SEARCH WORD character queue,
   second modifying means responsive to the determination means for modifying the character form of the (n+1)th and all following characters of the REPLACE WORD character queue to coincide with the character form of the nth character of the REPLACE WORD character queue, as modified by said first modifying means, when the REPLACE WORD character queue is longer than the SEARCH WORD character queue, and
   replace display means for replacing each found SEARCH WORD character queue stored in the memory means with a REPLACE WORD character queue as modified by the first modifying means and the second modifying means, and for displaying the modified REPLACE WORD character queue on the display.

2. The word processor according to claim 1, further comprising means for selecting said first and second optional search modes and said first and second optional replace modes such that entered character queues can be selectively searched and replaced with substitute words according to capital character only, small character only, and capital/small composite character forms.

* * * * *